United States Patent
Abe et al.

(10) Patent No.: US 7,281,734 B2
(45) Date of Patent: Oct. 16, 2007

(54) AIRBAG AND AIRBAG SYSTEM

(75) Inventors: Kazuhiro Abe, Tokyo (JP); Rika Senoo, Tokyo (JP)

(73) Assignee: Takata Corporation, Tokyo (JP)

( * ) Notice: Subject to any disclaimer, the term of this patent is extended or adjusted under 35 U.S.C. 154(b) by 349 days.

(21) Appl. No.: 11/019,589

(22) Filed: Dec. 23, 2004

(65) Prior Publication Data
US 2005/0116455 A1    Jun. 2, 2005

Related U.S. Application Data

(63) Continuation-in-part of application No. 10/680,403, filed on Oct. 8, 2003, now Pat. No. 7,111,866.

(30) Foreign Application Priority Data

| Jan. 23, 2003 | (JP) | 2003-015109 |
| Feb. 7, 2003 | (JP) | 2003-031139 |
| Dec. 25, 2003 | (JP) | 2003-430430 |

(51) Int. Cl.
*B60R 21/233* (2006.01)

(52) U.S. Cl. ............ 280/729; 280/739; 280/740; 280/743.2

(58) Field of Classification Search ............ 280/729, 280/738, 740, 742, 743.1, 743.2, 739
See application file for complete search history.

(56) References Cited

U.S. PATENT DOCUMENTS

| 5,165,716 A | 11/1992 | Imai et al. |
| 5,249,824 A | 10/1993 | Swann et al. |
| 5,253,892 A | 10/1993 | Satoh |
| 5,464,250 A | 11/1995 | Sato |
| 5,845,935 A * | 12/1998 | Enders et al. ............ 280/743.2 |
| 6,059,312 A * | 5/2000 | Staub et al. ............ 280/729 |
| 6,086,092 A | 7/2000 | Hill |
| 6,155,595 A * | 12/2000 | Schultz ............ 280/729 |
| 6,209,911 B1 | 4/2001 | Igawa et al. |
| 6,254,121 B1 | 7/2001 | Fowler et al. |
| 6,345,841 B2 * | 2/2002 | Igawa et al. ............ 280/740 |
| 2003/0020264 A1 | 1/2003 | Abe et al. |
| 2003/0034637 A1 | 2/2003 | Wang et al. |

(Continued)

FOREIGN PATENT DOCUMENTS

EP    1 318 052    6/2003

(Continued)

*Primary Examiner*—Paul N. Dickson
*Assistant Examiner*—Leonard McCreary, Jr.
(74) *Attorney, Agent, or Firm*—Manabu Kanesaka (57) ABSTRACT

An airbag to be inflated with gas from a gas generator includes a front panel disposed at a position adjacent to an occupant and a rear panel disposed at a position opposite to the occupant. The rear panel has an opening for the gas generator at the center thereof. An inner panel is provided for dividing an interior of the airbag into a central first chamber and a second chamber around the first chamber. The inner panel has an opening disposed substantially coaxially with the opening of the rear panel. The inner panel has a communication opening at a rear end thereof for communicating the first chamber and the second chamber. When the airbag becomes an inflated state, the communication opening is situated on at extension of a direction that gas is ejected from the gas generator.

9 Claims, 6 Drawing Sheets

U.S. PATENT DOCUMENTS

2003/0107205 A1  6/2003  Gu
2006/0186655 A1* 8/2006  Ehrke ..................... 280/743.1

FOREIGN PATENT DOCUMENTS

| JP | 1247242 | 10/1989 |
| JP | H1-247242 | 10/1989 |
| JP | 1311930 | 12/1989 |
| JP | 5178146 | 7/1993 |
| JP | 7232607 | 9/1995 |
| JP | 3022480 | 12/1995 |
| JP | 8104196 | 4/1996 |
| JP | 9315246 | 12/1997 |

* cited by examiner

AIRBAG AND AIRBAG SYSTEM

CROSS REFERENCE TO RELATED APPLICATIONS

The present application is a CIP Application of U.S. patent application Ser. No. 10/680,403 filed on Oct. 8, 2003 now U.S. Pat. No. 7,111,866.

BACKGROUND OF THE INVENTION AND RELATED ART STATEMENT

The present invention relates to an airbag mounted in a high-speed vehicle such as a car for protecting a human body in case of emergency such as a collision, and an airbag system including the airbag.

Various airbag systems including a driver-seat airbag system have been used for protecting an occupant in case of emergency such as a car collision. The driver-seat airbag system includes an airbag formed by stitching peripheries of an occupant-side front panel and an opposing rear panel. An inflator opening for receiving an end of an inflator is provided at a center of the rear panel. A periphery of the opening is fixed to a retainer with pins or rivets. The rear panel has a vent hole for absorbing an impact of a driver striking against the airbag by releasing air in the airbag.

Japanese Patent Publication (Kokai) No. 01-247242 has disclosed an airbag in which an inner panel disposed between an inflator opening in a rear panel and a front panel for dividing an interior of the airbag into a central first chamber and a second chamber. The inner panel has a substantially circular shape, and an outer rim thereof is connected to a middle portion between a center and a rim of the front panel. The inner panel has an inflator opening at a center thereof. A rim of the opening is fixed to a retainer together with the rear panel. The inner panel has a communication opening communicating between the first and second chambers. When the inflator is activated, the first chamber is inflated first, and then the second chamber is inflated. Gas flows from he first chamber into the second chamber through the communication opening, so that the second chamber is inflated completely after the first chamber is inflated completely.

An object of the present invention is to provide an airbag having an interior divided into a first chamber and a second chamber, in which the second chamber is inflated quickly.

Further objects and advantages of the invention will be apparent from the following description of the invention.

SUMMARY OF THE INVENTION

In order to attain the objects described above, according to a first aspect of the present invention, an airbag to be inflated with gas from a gas generator includes a front panel disposed at a side adjacent to an occupant and a rear panel disposed at a side opposite to the occupant. The front panel and the rear panel are joined together at rims thereof. The rear panel has an opening at the center thereof for inserting the gas generator. An inner panel is provided for dividing an interior of the airbag into a central first chamber and a second chamber around the first chamber. The inner panel has an opening disposed substantially coaxially with the opening of the rear panel. A rim of the inner panel is connected to a middle portion of the front panel between a center and the rim thereof. The inner panel has a communication opening at a rear end thereof for communicating the first chamber and the second chamber with each other. When the airbag becomes an inflated state, the communication opening is situated on an extension of a direction that gas is elected from the gas generator.

According to a second aspect of the present invention, in the airbag of the first aspect, the rear panel has a vent hole, and the inner panel has an inner vent hole communicating the first chamber and the second chamber with each other.

According to a third aspect of the present invention, in the airbag of one of the first and second aspects, the first chamber includes guide means for guiding gas from the gas generator into the communication opening.

According to a fourth aspect of the present invention, an airbag system includes the airbag of one of the first to third aspects and a gas generator having a gas port. At least an end of the gas generator is disposed in the airbag, and the gas port is also disposed in the airbag. When the airbag becomes an inflated state, the communication opening is situated so as to face the gas port of the gas generator.

According to a fifth aspect of the present invention, in the airbag system of the fourth aspect, the gas port includes a plurality of ports. When the airbag becomes an inflated state, the communication opening is situated on an extension of a direction that gas is ejected from at least one of the ports, and a panel part of the inner panel is situated on an extension of a direction that gas is ejected from the others of the ports.

According to a sixth aspect of the present invention, in the airbag system of one of the fourth and fifth aspects, when the gas generator is activated, the first chamber and the second chamber are inflated substantially at the same time.

According to a seventh aspect of the present invention, an airbag system includes an airbag and a gas generator having a gas port. At least an end of the gas generator is disposed in the airbag, and the gas port is disposed in the airbag. An interior of the airbag is partitioned into a central first chamber and a second chamber surrounding the first chamber. When the gas generator is activated, the first chamber and the second chamber are inflated substantially at the same time.

In the airbag and the airbag system of the invention, the communication opening communicating the first chamber and the second chamber with each other is situated on the extension of the direction that gas is elected from the gas generator, i.e. facing the gas port of the gas generator, disposed in the first chamber through the gas generator openings of the rear panel and the inner panel. Accordingly, when the gas generator is activated, gas is ejected from the gas port into the communication opening. The gas generator therefore supplies gas directly to the second chamber through the communication opening, thereby inflating the second chamber early.

In the airbag of the invention, the rear panel may have the vent hole, and the inner panel may have the inner vent hole communicating the first chamber and the second chamber with each other. With such a structure, when a human body strikes against the inflated airbag, gas in the first chamber and the second chamber can be released through the inner vent hole and the vent hole, thereby absorbing an impact.

In the airbag of the invention, the first chamber may have the guide means for guiding gas from the gas generator into the communication opening between the first chamber and the second chamber. With the guide means, it is possible to efficiently supply gas from the gas generator into the second chamber, thereby inflating the second chamber quickly.

In the airbag of the invention, the gas port may include a plurality of the ports, and the communication opening may be situated on the extension of the direction that gas is elected from at least one of the ports when the airbag becomes an inflated state. The panel part of the inner panel may be situated on the extension of the direction that gas is elected from the others of the ports. With such a structure, gas from the one of the ports (second-chamber gas port) is supplied directly into the second chamber through the communication opening, thereby inflating the second chamber early. Gas from the others of the ports (first-chamber gas port) strikes against the panel part of the inner panel and stays in the first chamber, thereby inflating the first chamber early.

With such a structure, the first chamber and the second chamber can be inflated substantially at the same time. For example, the first chamber and the second chamber can be inflated substantially at the same time by adjusting the number of the first-chamber gas ports and the second-chamber gas ports, or a size of the communication opening.

Even when the communication openings are situated on extensions of directions of all the ports, the first chamber and the second chamber can be inflated substantially at the same time by reducing sizes of the communication openings to limit an amount of gas flowing directly into the second chamber.

In the airbag system of the invention, upon activation of the gas generator, the first chamber and the second chamber of the airbag are inflated substantially at the same time. In this specification, "substantially at the same time" is defined such that a ratio $t1/t2$ of a time $t1$ from the activation of the gas generator to completion of the inflation of the first chamber to a time $t2$ from the activation of the gas generator to completion of the inflation of the second chamber is in a range of 0.9 to 1.1. When the first chamber and the second chamber are inflated substantially at the same time, an occupant can be received by the surface of the airbag facing the occupant in a fully inflated state.

BRIEF DESCRIPTION OF THE DRAWINGS

FIGS. 6(a) and 6(b) are perspective views of the rectifier cloth shown in FIG. 5, wherein FIG. 6(a) shows a detached state thereof, and FIG. 6(b) shows an attached state thereof.

DETAILED DESCRIPTION OF PREFERRED EMBODIMENTS

Figure 1:
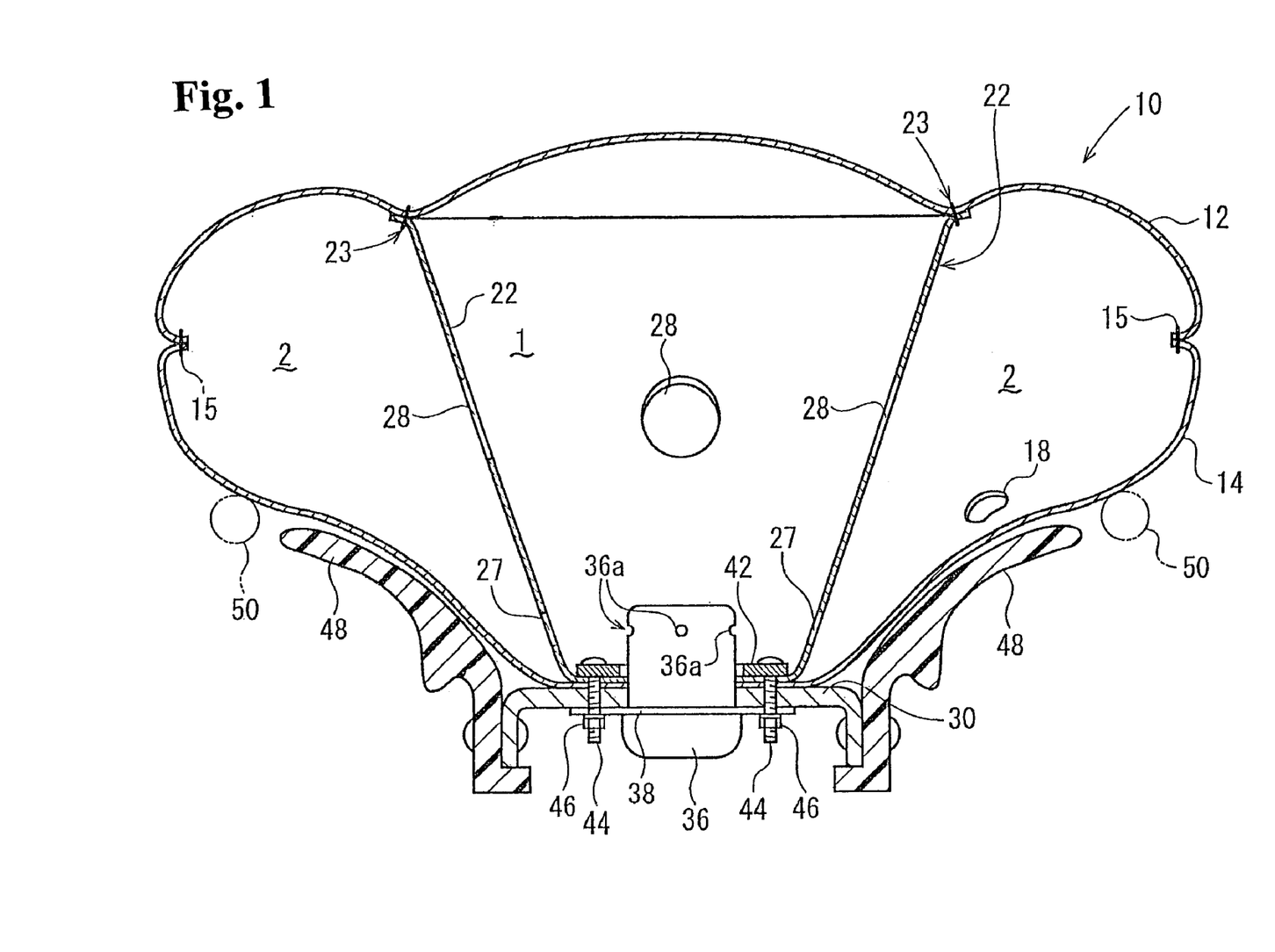
FIG. 1 is a cross-sectional view of an airbag and an airbag system according to an embodiment of the present invention.
Figure 2:
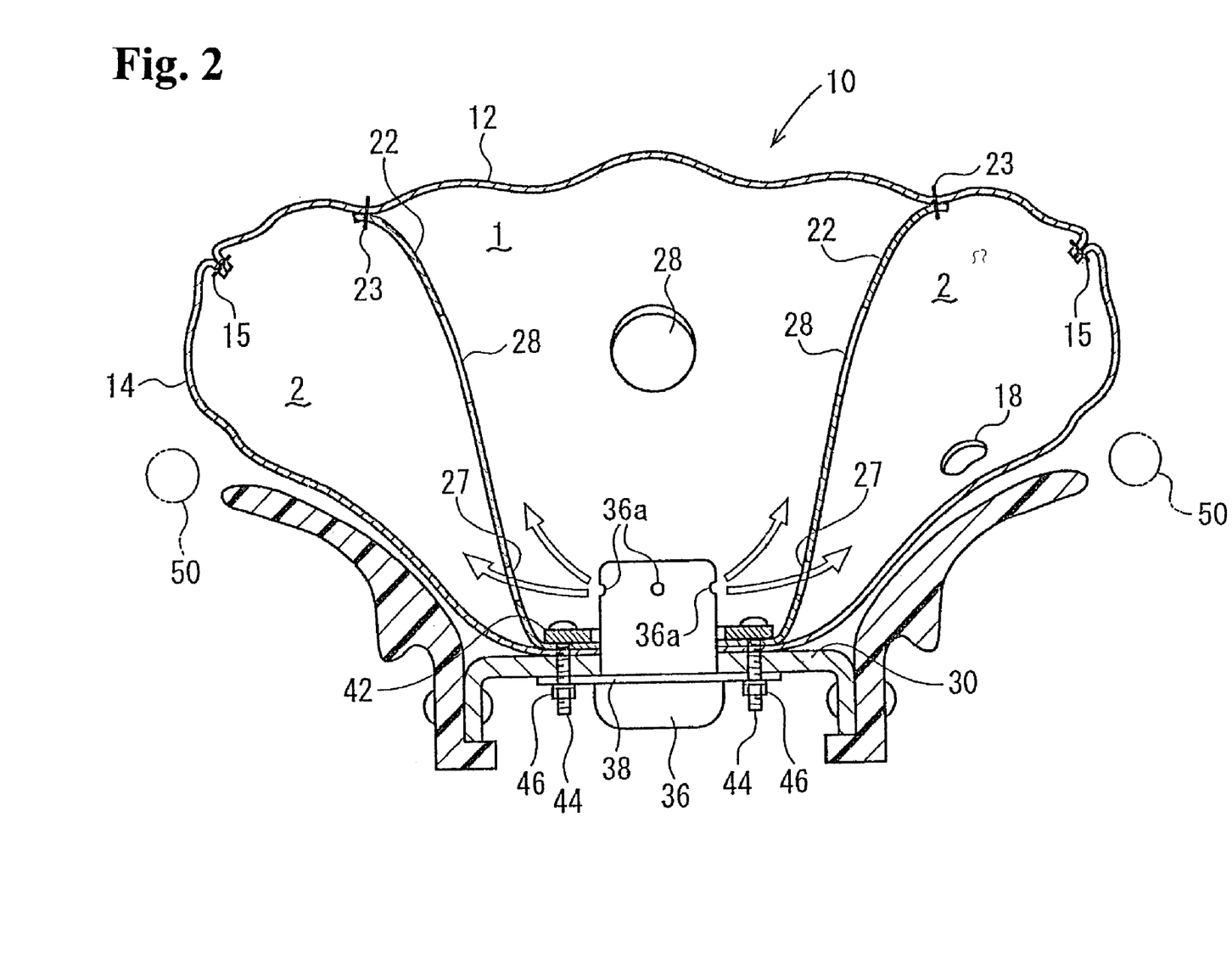
FIG. 2 is a cross-sectional view of the airbag shown in FIG. 1 in a state halfway through inflation.
Figure 3:
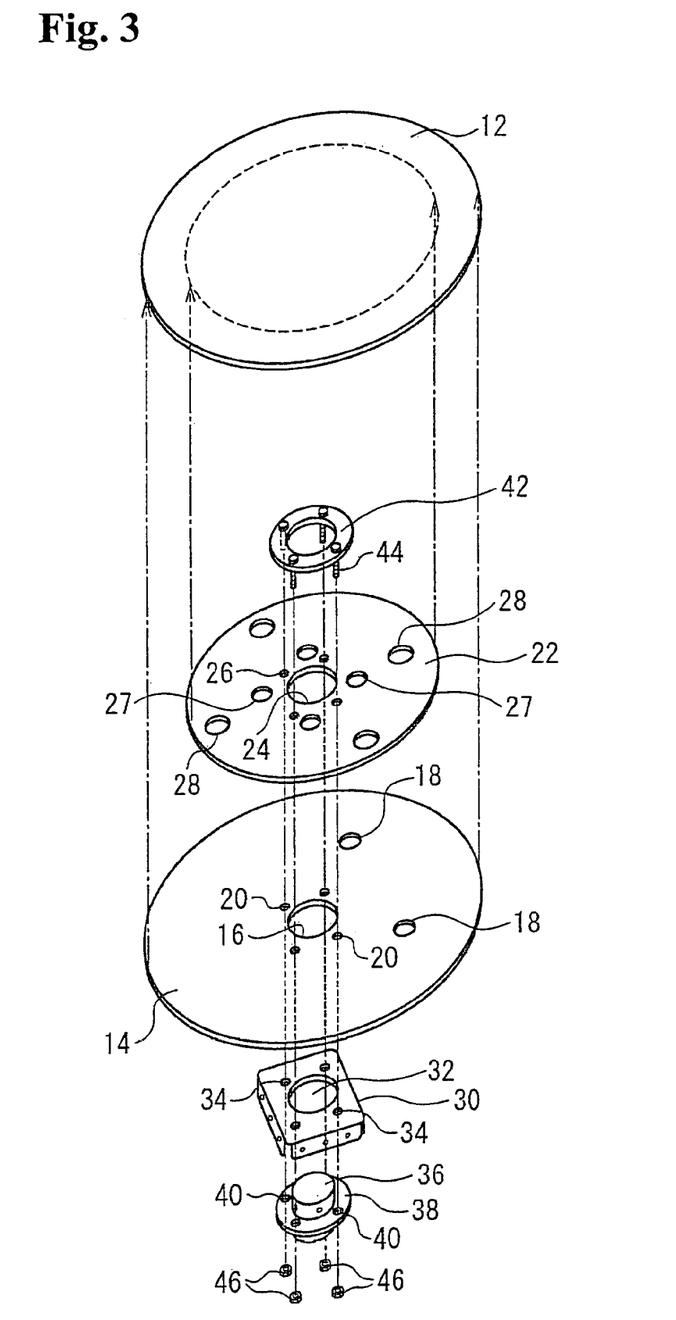
FIG. 3 is an exploded perspective view of the airbag and the airbag system shown in FIG. 1.

Hereunder, embodiments of the present invention will be described with reference to the accompanying drawings. FIGS. 1 and 2 are cross-sectional views of a car driver-seat airbag and an airbag system according to an embodiment the present invention. FIG. 3 is an exploded perspective view of the airbag and the airbag system. FIG. 1 shows the airbag in a fully inflated state. FIG. 2 shows the airbag in a state midway through inflation.

An airbag 10 includes a front panel 12, a rear panel 14, and an inner panel 22, all being made of circular cloths. The front panel 12 and the rear panel 14 have a same diameter, and outer rims thereof are stitched together with a seam 15 made of a thread or the like to form a bag shape. A stitched portion has a ring-shape extending around outer peripheries of the front panel 12 and the rear panel 14.

The rear panel 14 has an inflator (gas generator) opening 16 and vent holes 18. The inflator opening 16 is disposed at a center of the rear panel 14. Bolt insertion holes 20 are provided around the inflator opening 16. The inner panel 22 is disposed in the airbag 10. The inner panel 22 is substantially concentric with the front panel 12 and the rear panel 14. An outer rim of the inner panel 22 (rim at a leading end of the inner panel 22 when the airbag 10 is inflated) is joined with a middle portion between the center and the rim of the front panel 12 by stitching with a seam 23 made of a thread or the like. A stitched portion has a circular shape extending around the outer rim of the inner panel 22.

An inflator opening 24 is formed at a center of the inner panel 22 (at a trailing end of the inner panel 22 when the airbag 10 is inflated), and is substantially concentric with the inflator opening 16 in the rear panel 14. The openings 16 and 24 have a substantially same diameter. Bolt insertion holes 26 aligned with the bolt insertion holes 20 in the rear panel 14 are formed around the opening 24 in the inner panel 22. The inner panel 22 also has inner vent holes 28 at locations relatively close to the outer rim thereof, and communication openings 27 at locations close to the inner rim thereof.

A rim of the inflator opening 24 in the inner panel 22 is placed on a rim of the inflator opening 16 in the rear panel 14, and further placed on a rim of an inflator mounting hole 32 in a retainer 30. The rims of the inflator openings 24 and 16 are fixed to the retainer 30 via the bolt insertion holes 26 and 20. Accordingly, the rim of the inflator opening 24 in the inner panel 22 is connected to the rim of the inflator opening 16 in the rear panel 14, and the outer rim of the inner panel 22 is connected to the front panel 12 with the stitched portion 23 (seam). An interior of the airbag 10 is partitioned by the inner panel 22 into a central first chamber 1 and a second chamber 2 surrounding the first chamber 1. The first chamber 1 is disposed inside the inner panel 22.

The communication openings 27 are situated at a rear end of the first chamber 1 (adjacent to the rear panel 14), and the inner vent holes 28 are situated at a front end of the first chamber 1 (adjacent to the front panel 12). The communication openings 27 are situated on an extension of a direction that gas is ejected from an inflator 36 (described later) disposed in the first chanter 1 via the inflator openings 16 and 24, i.e. at a position facing gas ports 36a of the inflator 36.

In the embodiment, as shown in FIG. 3, the communication opening 27 and the inner vent holes 28 are formed at four positions with an equal interval along a circumference of the airbag. The communication openings 27 and the inner vent holes 28 are shifted from a center of the airbag. The openings 16 and 24, the communication openings 27, and the vent holes 18 and 28 may have a reinforcing patch and the like at rims thereof.

The retainer 30 for mounting the airbag 10 has the inflator mounting hole 32 at a center thereof and bolt insertion holes 34 around the inflator mounting hole 32. The inflator 36 has a substantially cylindrical shape and gas ports 36a around a side circumference thereof at a front end of a cylinder axis. In the embodiment, the gas ports 36a are formed at four positions with an equal interval around a circumference of the inflator 36. The inflator 36 elects gas radially through the gas ports 36a. A flange 38 for fixing the inflator 36 projects from a side circumference of the inflator 36 at a middle of the cylinder axis (closer to a rear end thereof than the gas ports 36a). The flange 33 has bolt-insertion holes 40. A front end of the inflator 36 is fitted in the inflator mounting hole 32.

When the airbag 10 is mounted in the retainer 30, the rims of the inflator openings 16 and 24 of the rear panel 14 and the inner panel 22 are held, and the rim of the inflator mounting hole 32 of the retainer 30 is held with a ferrule 42. The front end of the inflator 36 fitted in the inflator mounting hole 32 is inserted into the first chamber 1 via the inflator openings 16 and 24 The gas ports 36a formed at the front end of the inflator 36 face the communication openings 27 in the inner panel 22, respectively.

Stud bolts 44 of the ferrule 42 are inserted into the bolt insertion holes 26, 20, 34, an 40, and tightening nuts 46 are tightened to the ends thereof, so that the inner panel 22, the airbag 10 (rear panel 14), and the inflator 36 are fixed to the retainer 30. The airbag 10 is folded and a module cover 48 is mounted to the retainer 30 so as to cover the folded airbag 10, thereby completing the airbag system. The airbag system is mounted to a steering wheel, of a car (rim portion 50 shown in FIGS. 1 and 2).

In an event of a car collision, the inflator 36 is activated to eject gas into the airbag 10. The airbag 10 is inflated with gas to push the module cover 48 open and deploy in a cabin for protecting an occupant in a driver-seat. In the airbag 10, the communication openings 27 communicating between the first chamber 1 and the second chamber 2 are situated on an extension of a direction that gas is ejected from the inflator 36 disposed in the first chamber 1, or face the gas ports 36a of the inflator 36. Accordingly, upon activation of the inflator 36, gas is ejected from the inflator 36 into the communication openings 27, and is directly supplied into the second chamber 2 through the communication openings 27, as shown in FIG. 2, thereby inflating the second chamber 2 early.

When the occupant strikes against the inflated airbag 10, gas in the first chamber 1 and the second chamber 2 flows out through the inner vent holes 28 and the vent holes 18, thereby absorbing an impact.

In the embodiment, the communication openings 27 may have a relatively small size, so that a part of gas ejected through the gas ports 36a toward the communication openings 27 strikes against the rims of the communication openings 27 to flow into the first chamber 1, thereby inflating the first chamber 1 and the second chamber 2 substantially at the same time, In this case, when the communication openings 27 have a circular shape, the communication openings 27 may have a small diameter. Alternatively, the communication openings 27 may have elliptical, rectangular, and any other shapes.

The embodiment is just an example, and the invention is not limited to the embodiment. For example, although the embodiment includes four gas ports 36a and four communication openings 27, the invention is not limited to the embodiment. In the embodiment, the communication openings 27 are situated on the extension of the direction that gas is ejected from all of the gas ports 36a of the inflator 36. It may be constructed such that the communication openings 27 are situated on an extension of a direction that gas is ejected from one of the gas ports 36a, and a panel portion of the inner panel 22 is situated on an extension of a direction that gas is ejected from others of the gas ports 36a.

In the invention, a part of the communication openings may be shifted from the extension of the direction that gas is ejected from the gas ports 36a and may not face the gas ports 36a. That is, a part of the gas ports 36a may face the communication openings 27 to be used for the second chamber 2, and the panel portion of the inner panel 22 may be situated on the extension of the direction that gas is ejected from other of the gas ports 36a, so that the remaining gas ports 36a are used for inflating the first chamber 1. In this case, the first chamber 1 is inflated mainly with gas passing through the gas port for the first chamber 1, while the second chamber 2 is inflated mainly with gas passing through the gas port for the second chamber 2. Accordingly, it is possible to adjust the number and a size of the gas ports so that the first chamber 1 and the second chamber 2 are inflated substantially at the same time.

Figure 4:
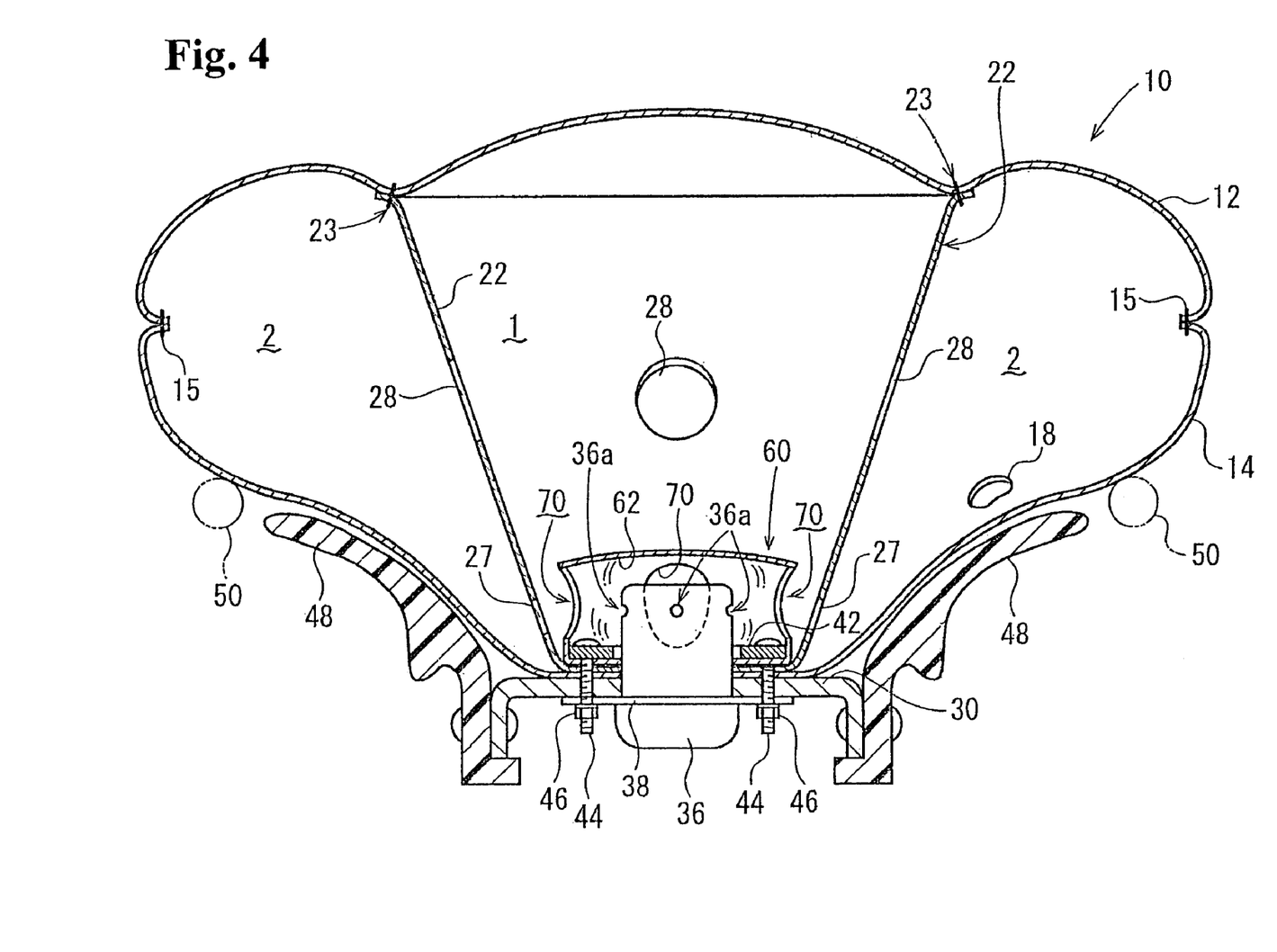
FIG. 4 is a cross-sectional view of an airbag and an airbag system according to another embodiment of the present invention.
Figure 5:
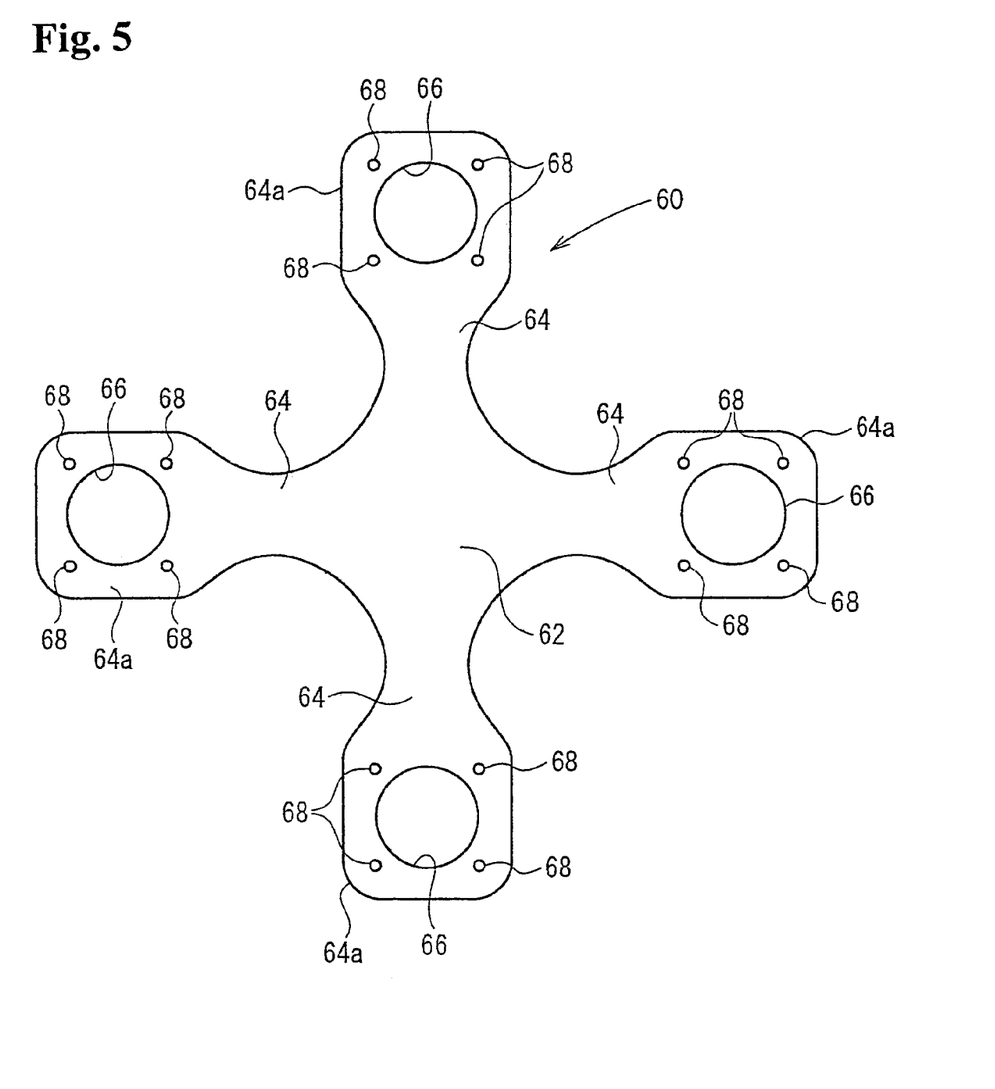
FIG. 5 is a developed view of a rectifier cloth of the airbag and the airbag system shown in FIG. 4.
Figure 6A:
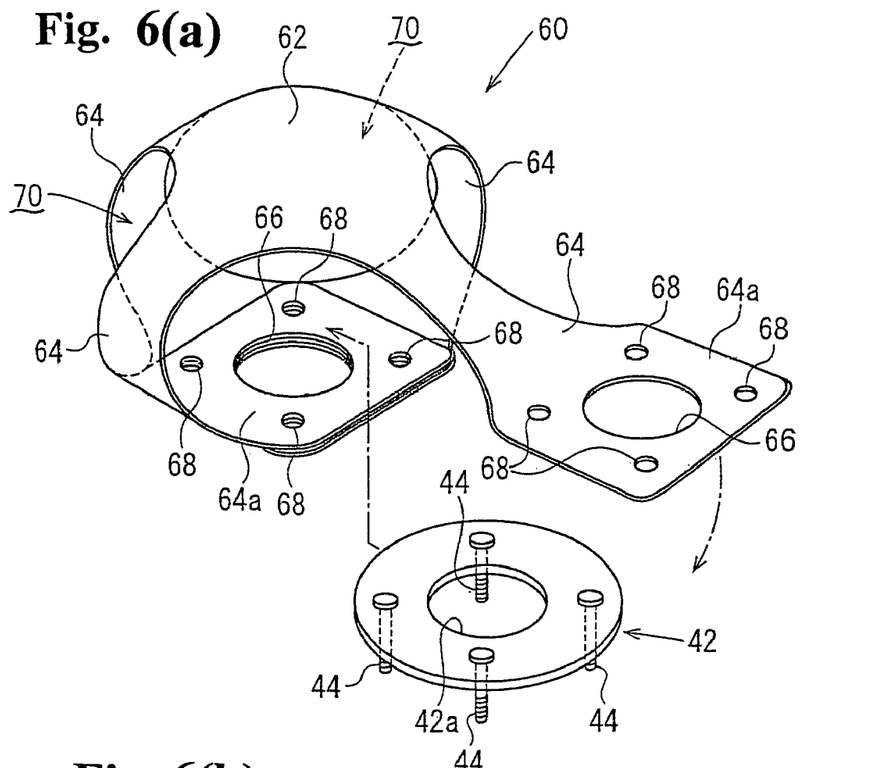
Figure 6B:
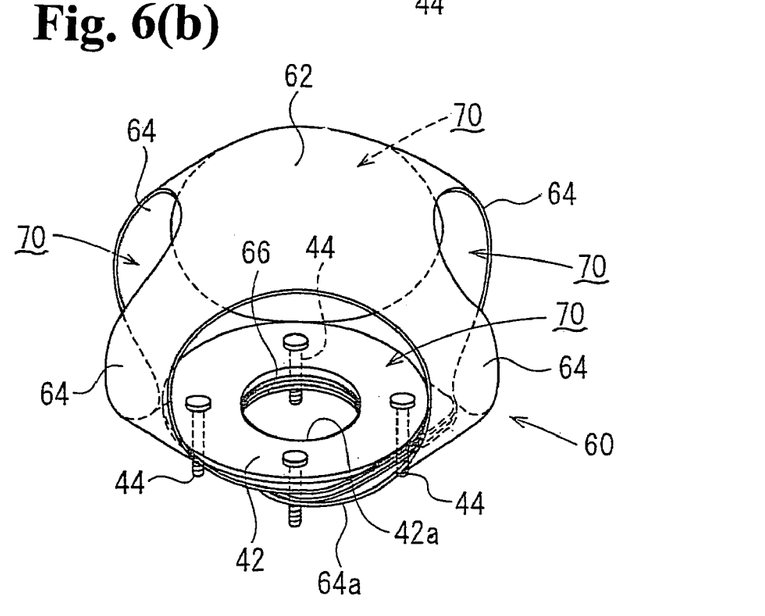

In the invention, guide means may be provided in the first chamber for guiding gas from the inflator into the communication openings for the first chamber 1 and the second chamber 2. FIG. 4 is a cross-sectional view of an airbag 10A including a rectifier cloth as the guide means disposed in the first chamber 1 and an airbag system including the airbag 10A. FIG. 3 is a plan view (developed view) of the rectifier cloth in a developed state. FIG. 6 (a) is a perspective view of the rectifier cloth before mounted to the ferrule. FIG. 6(b) is a perspective view of the rectifier cloth mounted to the ferrule.

The airbag 10A and the airbag system including the airbag 10A have substantially the same structure as the airbag 10 and the airbag system including the airbag 10 shown in FIGS. 1 to 3, except that the first chamber 1 includes a rectifier cloth 60 as the guide means for guiding gas from the inflator 36 into the communication openings 27 between the first chamber 1 and the second chamber 2. In FIGS. 4 to 6, reference numerals same as those in FIGS. 1 to 3 indicate the same components.

Referring to FIGS. 4 and 5, the rectifier cloth 60 includes a central part 62 covering the front end of the inflator 36 inserted into the first chamber 1 of the airbag 10A from a front side (occupant side), and four extending pieces 64 extending from the central part 62 in four directions. The adjacent extending pieces 64 intersect each other at a right angle.

Each of the extending piece 64 is led to an underside of the ferrule 42 (between the ferrule 42 and the rim of the inflator opening 24 in the inner panel 22 (not shown in FIG. 4, refer to FIG. 3)). An inflator opening 66 aligned with the central opening 42a (refer to FIG. 6) of the ferrule 42 is provided at an end 64a of the extending piece 64. Bolt insertion holes 68 are provided around the inflator opening 66 for inserting the stud bolts 44 protecting from a lower surface of the ferrule 42. The stud bolts 44 of the ferrule 42 are inserted into the bolt insertion holes 68, so that the extending pieces 64 are attached to the ferrule 42. Ends 64a of the extending pieces 64 are held below the ferrule 42, so that the inflator opening 66 is aligned with the central opening 42a of the ferrule 42.

Referring to FIG. 6(a), in the embodiment, before the rectifier cloth 60 is mounted to the ferrule 42, three of the extending pieces 64 are placed below the ferrule 42. The ends 64a of the three extending pieces 64 are stitched together such that the respective inflator openings 66 are aligned with the bolt insertion holes 68. When the rectifier cloth 60 is attached to the ferrule 42, the ferrule 42 is inserted into a space surrounded by the three extending pieces 64 from a side of the one remaining extending piece 64. Then, the stud bolts 44 of the ferrule 42 are inserted into the bolt insertion holes 68 at the ends 64a of the stitched three extending pieces 64. The rim of the inflator opening 66 at the innermost end 64a is aligned with the ferrule 42. Then, the one remaining extending piece 64 is placed under the ferrule 42, so that the end 64a thereof is placed under the ends 64a of the stitched three extending pieces 64 while the stud bolts 44 of the ferrule 42 are inserted into the bolt insertion holes 68 at the end 64a. With such a process, it is possible to easily attach the rectifier cloth 60 to the ferrule 42.

The ends 64a of the extending pieces 64 are attached to the ferrule 42, so that the vent holes 70 are formed between the extending pieces 64. As shown in FIG. 4, the vent holes 70 face the communication openings 27 communicating the first chamber 1 and the second chamber 2 with each other and provided at the rear end of the inner panel 22 (rear end of the first chamber 1) dividing the airbag 10A into the first chamber 1 and the second chamber 2. Referring to FIG. 5, sides of the extending piece 64 are formed in an arc shape curving substantially toward a center of the central part 62. Accordingly, each of the vent holes 70 surrounded by the sides of the extending pieces 64 is formed in a substantially circular shape, as shown in FIGS. 4, 6(a) and 6(b).

The airbag system including the airbag 10A is assembled in the same way as that of the embodiment shown in FIGS. 1 to 3, except that the rectifier cloth 60 is attached to the ferrule 42 in advance. In the airbag 10A with such a structure, when the inflator 36 ejects gas in the space surrounded by the rectifier cloth 60, gas from the inflator 36 is led into the first chamber 1 through the vent holes 70 facing the communication openings 27 communicating the first chamber 1 with the second chamber 2. That is, gas from the inflator 36 is guided into the communication openings 27 through the vent holes 70. Accordingly, gas from the inflator 36 flows into the second chamber 2 through the communication openings 27 efficiently, thereby inflating the second chamber 2 quickly.

In the embodiment, all of the vent holes 70 face the communication openings 27 communicating the first chamber 1 with second chamber 2. One of the vent holes 70 may not face the communication opening 27. In this case, it is possible to adjust an opening area of each vent hole for inflating the first chamber 1 and the second chamber 2 at a controlled speed.

In the invention, the guide means for guiding gas from the inflator into the communication openings is not limited to the rectifier cloth shown in the drawings, and may have a structure other than the rectifier cloth. For example, a duct (pipe) may be disposed for guiding gas from the inflator into the communication openings.

The foregoing embodiments of the invention are applied to the driver-seat airbag and the driver-seat airbag system, and can also be applied to other various airbags and airbag systems.

The disclosure of Japanese Patent Application No. 2003-430430, filed on Dec. 25, 2003, is incorporated in the application.

While the invention has been explained with reference to the specific embodiments of the invention, the explanation is illustrative and the invention is limited only by the appended claims.

What is claimed is:

1. An airbag to be inflated with gas for protecting an occupant, comprising:

a front portion facing the occupant, a rear portion opposite to the occupant to form the airbag with the front portion, said rear portion having a first opening for inserting a gas generator, an inner panel disposed in the airbag for dividing the airbag into a first chamber located in a center portion of the airbag and a second chamber surrounding the first chamber, said inner panel having a second opening arranged generally coaxially with the first opening and a communication opening at a rear side thereof for communicating the first chamber with the second chamber, said communication opening being adapted to be situated on an ejecting direction that the gas is ejected from the gas generator when the airbag is inflated, and a guide device disposed in the first chamber for guiding the gas from the gas generator toward the communication opening, said guide device having a vent hole facing the communication opening of the inner panel for directing the gas to the communication opening.

2. An airbag according to claim 1, wherein said inner panel is connected to the front portion at a location between the center portion and a rim portion of the front portion.

3. An airbag according to claim 1, wherein said rear portion has a vent hole for communicating the second chamber with outside, and said inner panel has an inner vent hole for communicating the first chamber with the second chamber.

4. An airbag system comprising the airbag according to claim 1 and a gas generator having a first gas port disposed in the airbag, said communication opening being situated on the ejection direction that the gas is ejected from the first gas port of the gas generator when the airbag is inflated.

5. An airbag system according to claim 4, wherein said gas generator further includes a second gas port disposed in the airbag, said second gas port facing the inner panel when the airbag is inflated.

6. An airbag system according to claim 4, wherein said first chamber and said second chamber are arranged to be inflated substantially at a same time when the gas generator is activated.

7. An airbag according to claim 1, wherein said guide device is arranged inside the inner panel to be spaced laterally from the inner panel so that the gas can flow through the vent hole and communication opening without deflection.

8. An airbag according to claim 7, wherein said guide device comprises a center part for covering the first and second openings, and extending pieces extending from the center part and connected to the rear portion, a space between two extending pieces situated adjacent to each other forming the vent hole.

9. An airbag according to claim 8, wherein each of said extending pieces includes an innermost end with an inflator opening aligned with the first and second openings.

* * * * *